US010973333B2

(12) United States Patent
Seibold

(10) Patent No.: US 10,973,333 B2
(45) Date of Patent: Apr. 13, 2021

(54) STADIUM SEAT HAVING A SPLIT BACK RECLINER AND A VEHICLE INCLUDING A STADIUM SEAT HAVING A SPLIT BACK RECLINER

(71) Applicant: Adient Luxembourg Holding S.à.r.l., Luxembourg (LU)

(72) Inventor: Kurt Seibold, Farmington Hills, MI (US)

(73) Assignee: Adient Luxembourg Holding S.á r.l., Luxembourg (LU)

( * ) Notice: Subject to any disclaimer, the term of this patent is extended or adjusted under 35 U.S.C. 154(b) by 72 days.

(21) Appl. No.: 15/718,550

(22) Filed: Sep. 28, 2017

(65) Prior Publication Data

US 2018/0092465 A1 Apr. 5, 2018

Related U.S. Application Data

(60) Provisional application No. 62/402,496, filed on Sep. 30, 2016.

(51) Int. Cl.
| | |
|---|---|
| *A47C 7/46* | (2006.01) |
| *B60N 2/22* | (2006.01) |
| *A47C 1/121* | (2006.01) |
| *A47C 7/18* | (2006.01) |
| *B60N 2/68* | (2006.01) |

(Continued)

(52) U.S. Cl.
CPC .............. *A47C 7/462* (2013.01); *A47C 1/121* (2013.01); *A47C 7/18* (2013.01); *B60N 2/22* (2013.01); *B60N 2/2222* (2013.01); *B60N 2/2352* (2013.01); *B60N 2/305* (2013.01); *B60N 2/68* (2013.01)

(58) Field of Classification Search
CPC .......... A47C 7/462; A47C 1/121; A47C 7/18; B60N 2/22; B60N 2/2222; B60N 2/2352; B60N 2/305; B60N 2/68
See application file for complete search history.

(56) References Cited

U.S. PATENT DOCUMENTS

| 4,641,884 A | * | 2/1987 | Miyashita | ............ B60N 2/2252 |
| | | | | 297/284.1 |
| 5,112,109 A | * | 5/1992 | Takada | ................. B60N 2/2222 |
| | | | | 297/320 |

(Continued)

FOREIGN PATENT DOCUMENTS

| FR | 2844489 A1 | * | 3/2004 | ........... B60N 2/2222 |
| JP | 2634542 B2 | * | 7/1997 | ........... B60N 2/2222 |

OTHER PUBLICATIONS

Machine translation of foreign reference FR2844489, obtained from http://translationportal.epo.org/emtp/translate/?ACTION=description-retrieval&COUNTRY=FR&ENGINE=google&FORMAT=docdb&KIND=A1&LOCALE=en_EP&NUMBER=2844489&OPS=ops.epo.org/3.2&SRCLANG=fr&TRGLANG=en (last accessed on May 8, 2019) (Year: 2019).*

(Continued)

*Primary Examiner* — Theodore V Adamos
(74) *Attorney, Agent, or Firm* — Marshall & Melhorn, LLC

(57) ABSTRACT

A stadium seat having a seat back structure that is movable from a seat back forward position to a seat back rearward position. The seat back structure has an occupant contact surface. In the seat back forward position, the occupant contact surface has a planar contour. In the seat back rearward position, the occupant contact surface has non-planar contour.

20 Claims, 10 Drawing Sheets

(51) Int. Cl.
*B60N 2/30* (2006.01)
*B60N 2/235* (2006.01)

(56) References Cited

U.S. PATENT DOCUMENTS

| | | | |
|---|---|---|---|
| 9,308,836 B2* | 4/2016 | Hausler | B60N 2/3031 |
| 2004/0232283 A1* | 11/2004 | Ferny | B60N 2/206 |
| | | | 244/118.6 |
| 2010/0102605 A1* | 4/2010 | Yamada | B60N 2/0232 |
| | | | 297/284.3 |
| 2010/0244525 A1* | 9/2010 | Ito | B60N 2/0232 |
| | | | 297/353 |
| 2013/0175393 A1* | 7/2013 | Udriste | B64D 11/06 |
| | | | 244/122 R |
| 2013/0300174 A1* | 11/2013 | Ito | B60N 2/1615 |
| | | | 297/354.1 |
| 2014/0256499 A1* | 9/2014 | Lippert | F16H 3/46 |
| | | | 475/275 |
| 2015/0137571 A1* | 5/2015 | Koike | B60N 2/643 |
| | | | 297/340 |
| 2016/0075260 A1* | 3/2016 | Atger | B60N 2/22 |
| | | | 297/354.12 |
| 2016/0345740 A1* | 12/2016 | Lu | A47C 17/04 |
| 2019/0184879 A1* | 6/2019 | Kapusky | A47C 1/036 |

OTHER PUBLICATIONS

Machine translation of foreign reference JP2634542 B, obtained from https://www.j-platpat.inpit.go.jp/p0200, last accessed on Aug. 4, 2020. (Year: 2020).*

* cited by examiner

STADIUM SEAT HAVING A SPLIT BACK RECLINER AND A VEHICLE INCLUDING A STADIUM SEAT HAVING A SPLIT BACK RECLINER

CROSS REFERENCE TO RELATED APPLICATIONS

This application claims the benefit of priority of U.S. provisional application 62/402,496 filed Sep. 30, 2016, the entire contents of which are incorporated herein by reference.

FIELD OF THE INVENTION

The present invention relates to a stadium seat having a split back recliner and a vehicle that includes a stadium seat having a split back recliner.

BACKGROUND OF THE INVENTION

Stadium seats are used in vehicles, especially in second row seating in pick-up trucks or sedans. Due to space constraints in vehicles, conventional stadium seats have seat backs that do not recline. This provides an uncomfortable sitting experience for an occupant since the occupant sits upright and cannot recline the seat back.

SUMMARY OF THE INVENTION

An object of the present invention is to provide a stadium seat that can move from a forward position to a rearward position. According to the present invention, the stadium seat includes a seat back that changes contour as the seat back moves from the forward position to the rearward position. This provides a more comfortable seating experience for a user since the stadium seat has the ability to recline.

According to the present invention, a stadium seat comprises a seat back structure. The seat back structure comprises a seat back structure frame having at least a first pivot connection and a second pivot connection.

The seat back structure frame may comprise a first seat back structure frame, a second seat back structure frame and a third seat back structure frame. The first pivot connection and the second pivot connection may be defined by one or more of the first seat back structure frame, the second seat back structure frame and the third seat back structure frame.

The stadium seat may further comprise an actuator and a locking/unlocking mechanism connected to the actuator. The first seat back structure frame, the second seat back structure frame and the third seat back structure frame may be movable when the actuator is actuated to adjust the seat back structure from a forward seat back position to a rearward seat back position. The first seat back structure frame, the second seat back structure frame and the third seat back structure frame may define a planar frame configuration in the forward seat back position. The first seat back structure frame, the second seat back structure frame and the third seat back structure frame may define a non-planar frame configuration in the rearward seat back structure position.

The seat back structure may comprise a planar user contact surface in the forward seat back position. The seat back structure may have a non-planar user contact surface in the rearward seat back position.

The seat back structure may comprise one of a one-piece panel and a plurality of foam segments.

The stadium seat may comprise a cushion. The cushion may be mounted for movement such that the cushion is movable from a use position to a stadium position. The cushion may extend in a horizontal direction in the use position. The cushion may extend in a vertical direction in the stadium position.

The first seat back structure frame may be arranged in an upper area of the seat back structure. The second seat back structure frame may extend between the first seat back structure frame and the third seat back structure frame.

The locking/unlocking mechanism may comprise a locking element having a plurality of first teeth. The first seat back structure may comprise a plurality of second teeth. The first teeth may engage the second teeth to lock the first seat back structure frame, the second seat back structure frame and the third seat back structure frame in a fixed position.

The first teeth may be located at a spaced location from the second teeth when the actuator is operated such that at least the second seat back structure frame and the third seat back structure frame are movable relative to each other.

The seat back structure may be incrementally adjustable when the actuator is actuated.

According to the present invention, a stadium seat comprises a seat back frame comprising a first seat back frame portion and a second seat back frame portion. The first seat back frame portion is pivotably connected to the second seat back frame. A seat back user support structure is connected to the seat back frame. The stadium seat further comprises an actuator and the locking/unlocking mechanism. The locking/unlocking mechanism is connected to the seat back frame. The actuator actuates the locking/unlocking mechanism such that the locking/unlocking mechanism changes from a locking state to an unlocking state when the actuator is actuated. A contour of the seat back user support structure changes when the actuator is actuated.

At least the second seat back frame portion may move relative to the first seat back frame portion in the unlocking state.

The seat back structure may move from the forward seat back position to the rearward seat back position when the actuator is in the unlocking state.

The seat back user support structure may comprise a planar occupant contact surface in the forward seat back position. The seat back user support structure may have a non-planar occupant contact surface in the rearward seat back position.

The seat back frame may comprise a third seat back frame portion. The second seat back frame portion may be pivotably connected to the third seat back frame portion. At least the second seat back frame portion and the third seat back frame portion may be movable in the unlocked state.

The locking/unlocking mechanism may comprise a locking element. The locking element may comprise a plurality of first teeth. The first seat back frame portion may comprise a plurality of second teeth. The first teeth may engage the second teeth in the locked state. The first teeth may be located at a spaced location from the second teeth in the unlocked state.

According to the present invention, a vehicle seat comprises a stadium seat having one or more of the features previously discussed.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
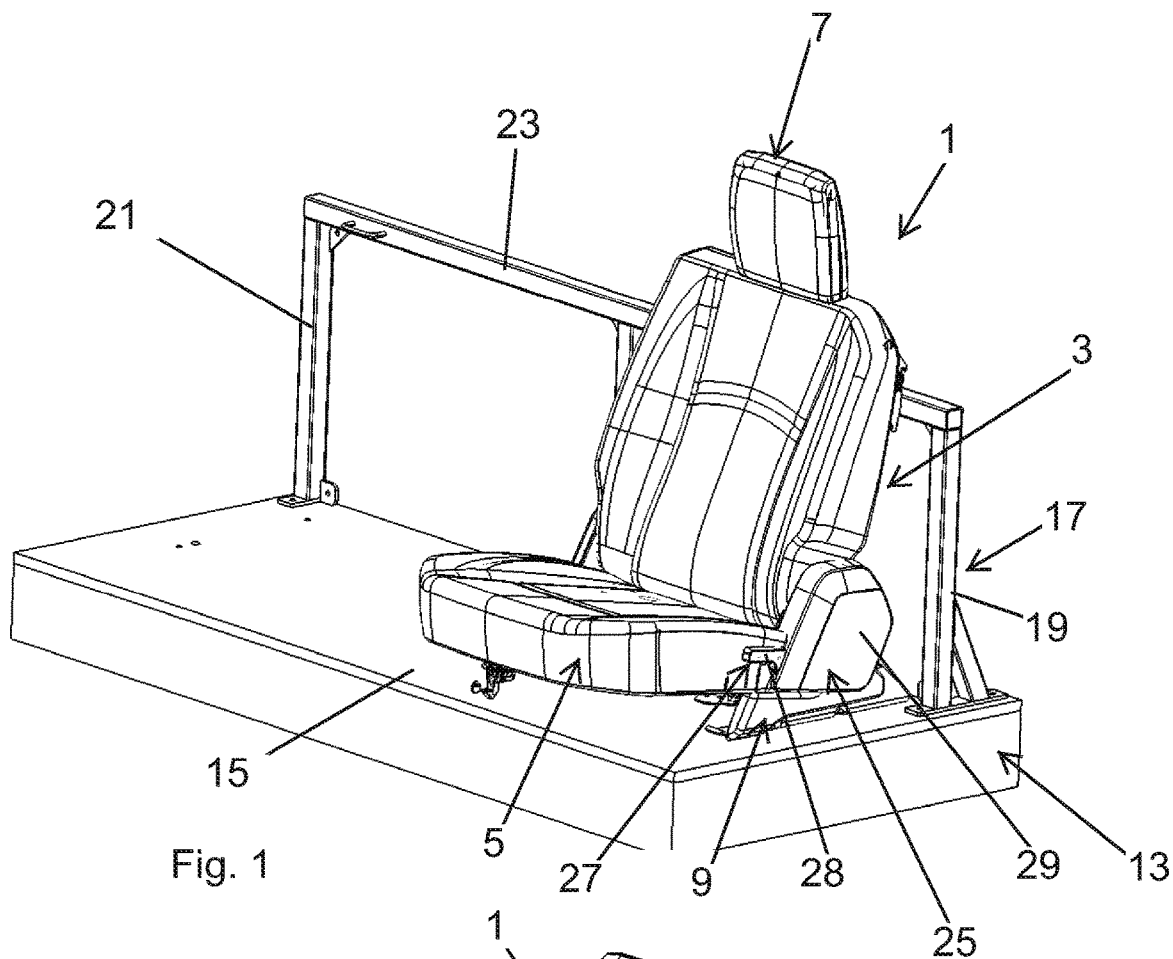
FIG. 1 is a perspective view of a stadium seat.

Referring to the drawings in particular, FIG. 1 is a perspective view of a stadium seat 1. The stadium seat 1 has a seat back structure 3 and a cushion 5. The seat back structure 3 is connected to a head rest structure 7. The head rest structure 7 may be integrally connected to the seat back structure 3 such that the head rest structure 7 and the seat back structure 3 are formed in one piece. The stadium seat 1 is connected to a vehicle structure 13 via a vehicle seat connecting structure 9 and another vehicle seat connecting structure 11. Although two vehicle seat connecting structures 9, 11 are shown, it is understood that any number of vehicle seat connecting structures may be used to connect the stadium seat 1 to the vehicle structure 13. The seat back structure 3 is connected to the vehicle seat connecting structure 9 and the another vehicle seat connecting structure 11.

Figure 2:
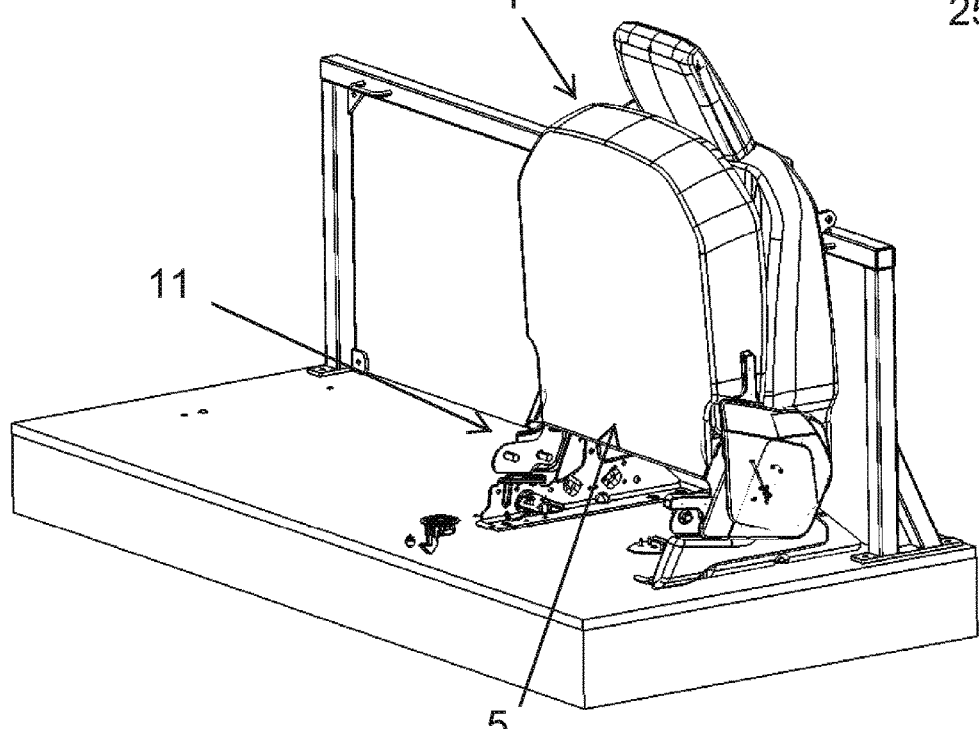
FIG. 2 is a perspective view of the stadium seat of FIG. 1 in a stadium seat position.

The vehicle structure 13 includes a vehicle floor 15 and a vehicle seat support structure 17. The vehicle seat support structure 17 includes an upward extending support member 19, another upward extending support member 21 located at a spaced location from the upward extending support member 19 and a transverse vehicle seat support member 23 that is connected to the upward extending support member 19 and the another upward extending support member 21. The seat back structure 3 is connected to the transverse vehicle seat support member 23. The stadium seat includes a release mechanism 25 that has an actuator 27. The actuator 27 is shown in the form of a lever 28, however it is understood that any actuator 27 may be used, including but not limited to a button, a handle or toggle switch. Actuating the actuator 27 allows the stadium seat 1 to recline, which will be discussed in more detail below. At least a portion of the lever is arranged in an actuator release mechanism housing 29. The cushion 5 is pivotably connected to the vehicle seat connecting structure 9 and the another vehicle seat connecting structure 11. When the cushion 5 is moved in an upward direction via a user, the cushion 5 and the release mechanism 25 rotate from a use position (as shown in FIG. 1), in which the occupant can sit on the cushion 5, to a stowed position (as shown in FIG. 2). With the cushion 5 in the use position, the cushion 5 supports a user's buttocks and at least a portion of the occupant's legs and the seat back structure 3 supports at least a back portion and shoulder portion of the user.

FIG. 2 is a perspective view of the stadium seat 1 with the cushion 5 in the stowed position.

Figure 3:
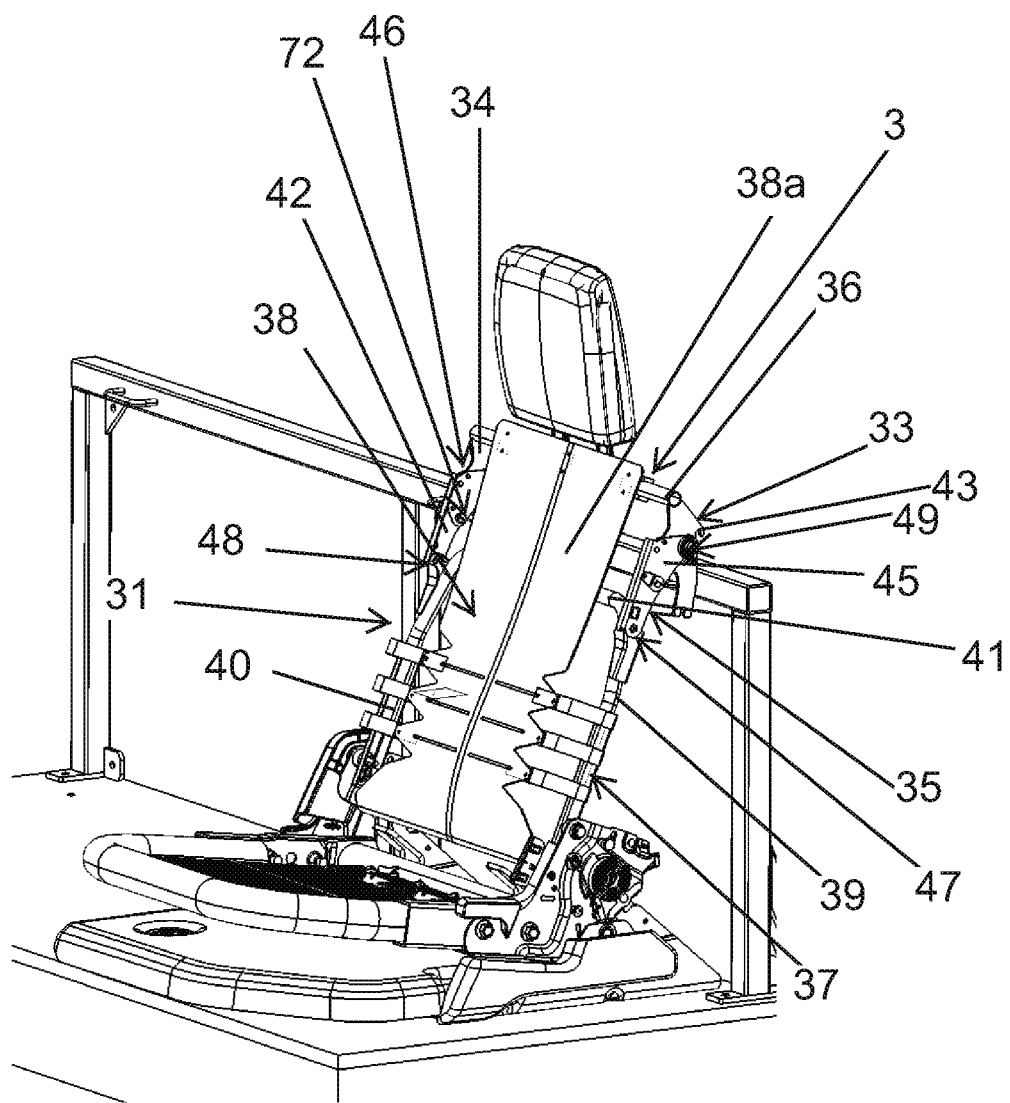
FIG. 3 is a perspective view of the stadium seat of FIG. 1 with trim removed.

FIG. 3 is a perspective view of the stadium seat 1. The seat back structure 3 has a seat back frame 31. The seat back frame 31 has an upper seat back frame structure 33, an intermediate seat back frame structure 35 and a main seat back frame structure 37. A seat back user support structure 38 is connected to the seat back frame 31. The seat back user support structure 38 may be formed in one piece to provide a one-piece integrally formed seat back user support structure or the seat back user support structure 38 may be formed in sections such that each section is movable relative to another section. The seat back user support structure 38 has a seat back user support structure surface 38a. The upper seat back frame structure 33 has an upper seat back frame member 34, an upper seat back frame member 43 and a transverse member 36. The upper seat back frame member 34 is located opposite the upper seat back frame member 43. The transverse member 36 is connected to the upper seat back frame member 34 and the upper seat back frame member 43 and the transverse member 36 extends between the upper seat back frame member 34 and the upper seat back frame member 43. The intermediate frame structure 35 has an intermediate frame member 45 and an intermediate frame member 42. The main seat back frame structure 37 has a main seat back frame member 39, a main seat back frame member 40 and a main seat back frame transverse member 41. The main seat back frame member 40 is located opposite the main seat back frame member 39. The main seat back frame transverse member 41 is connected to the main seat back frame member 39 and the main seat back frame member 40 and the main seat back frame transverse member 41 extends between the main seat back frame member 39 and the main seat back frame member 40. The upper seat back frame structure 33 is connected to the main seat back frame structure 37 via the intermediate seat back frame structure 35. The intermediate seat back frame member 45 is pivotably connected to the upper seat back frame member 43 and the main seat back frame member 39. The intermediate seat back frame member 42 is pivotably connected to the upper seat back frame member 34 and the main seat back frame member 40. A pivot connection 47 is defined by the intermediate seat back frame member 45 and the main seat back frame member 39. A pivot connection 49 is defined by the intermediate seat back frame member 45 and the upper seat back frame member 43. A pivot connection 46 is defined by the intermediate seat back frame member 42 and the upper seat back frame member 34. A pivot connection is defined by the intermediate seat back frame member 42 and the main seat back frame member 40. The seat back 3 is shown in a back full forward (non-reclined) position in FIG. 3. In the back full forward position, the seat user support structure surface 38a is planar (linear) and non-planar, particularly not curved, as shown in FIG. 3.

Figure 4:
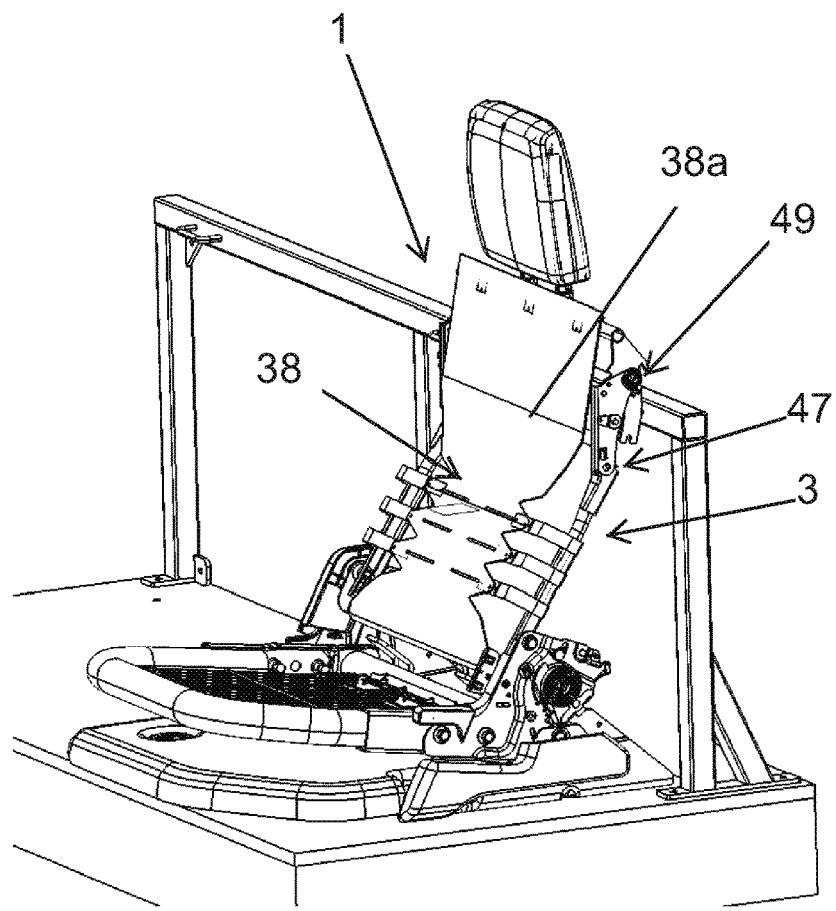
FIG. 4 is a perspective view of the stadium seat of FIG. 3 in a seat back rearward position.

FIG. 4 shows the seat back 3 in a back full rearward position (reclined position).

The seat user support structure surface 38a has a non-planar shape, preferably an arcuate shape (curved shape), in the back full rearward position. The seat back 3 moves from the back full forward position to the back full rearward position by actuating the actuator 27. Actuation of the actuator 27 causes the intermediate seat back frame structure 35 to become unlocked from the upper seat back frame structure 33 such that the intermediate frame structure 35 and the main seat back frame structure 37 are movable relative to each other. When the intermediate seat back frame structure 35 is unlocked from the upper seat back frame structure 33, the main seat back frame structure 37 is movable from the back full forward position shown in FIG. 3 to the back full rearward position shown in FIG. 4. The seat back structure 3 is movable when the actuator 27 is actuated by the user or a seat back structure actuator, such as a motor, may be provided to move the seat back structure 3 when the actuator 27 is actuated.

Figure 5:
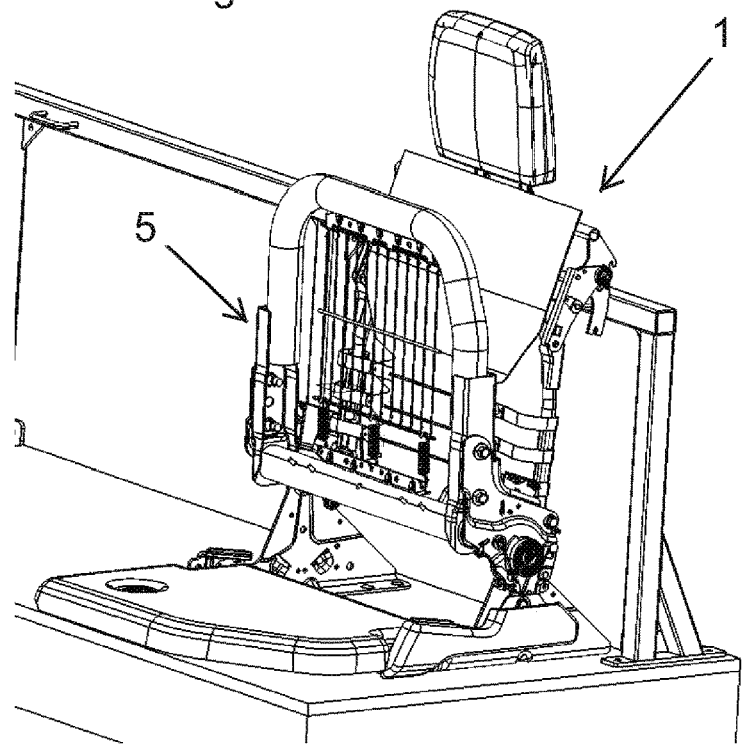
FIG. 5 is a perspective of the stadium seat of FIG. 3 with a cushion in an upright position.

FIG. 5 is a perspective of the stadium seat 1 with the cushion in an upright (stowed) position.

Figures 6, 7, 8:
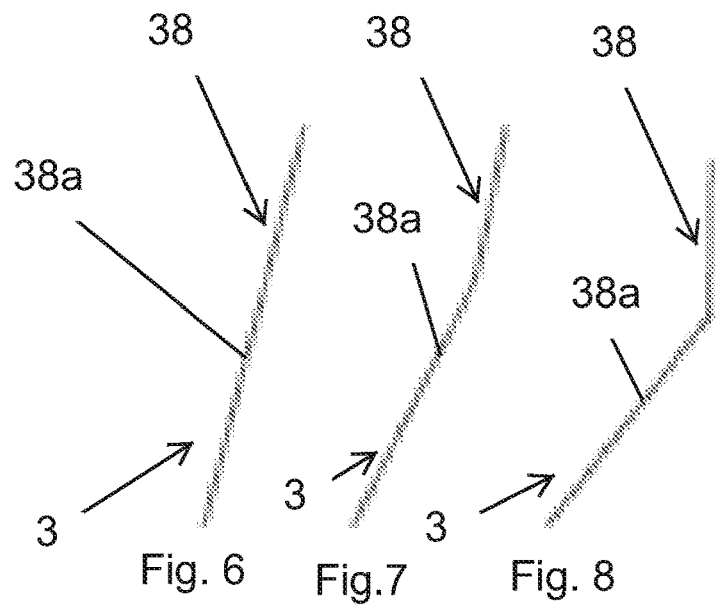
FIG. 6 is a side view of a seat back structure of the stadium seat of FIG. 3 in a forward seat back position.
FIG. 7 is a side view of the seat back structure of FIG. 3 in an intermediate rearward seat back position.
FIG. 8 is a side view of the seat back structure of FIG. 3 in a full rearward seat back position.

FIG. 6 is a side view of the seat back structure 3 in the back full forward position. The seat user support structure surface 38a is straight (linear, planar) in the back full forward position. The intermediate seat back frame structure 35, the upper seat back frame structure 33 and the main seat back frame structure 37 are in a planar configuration when the seat back structure 3 is in the back full forward position.

FIG. 7 is a side view of the seat back structure 3 in a back intermediate rearward position wherein the seat back structure 3 has moved from the back full forward position to the back intermediate rearward position. In the back intermediate rearward position, the seat user support structure surface 38a has a non-planar contour, preferably a curved (arcuate) contour and the intermediate seat back frame structure 35, the upper seat back frame structure 33 and the main seat back frame structure 37 are in a non-planar configuration.

FIG. 8 is a side view of the seat back structure 3 in the back full rearward position wherein the seat back structure 3 has moved from the back intermediate rearward position to the back full rearward position. In the back full rearward position, the seat user support structure surface 38a has a non-planar contour, preferably a curved (arcuate) contour that is more curved than the seat user support structure in the intermediate position. The seat user support structure 38 is located in a more rearward position than when the seat back structure is in the intermediate position. The seat user support structure 38 may be more reclined in the back full rearward position than when the seat back structure is in the intermediate position. The main seat frame member 39 is located in a more rearward position than when the main seat back frame member 39 is in the back intermediate rearward position.

Figure 9:
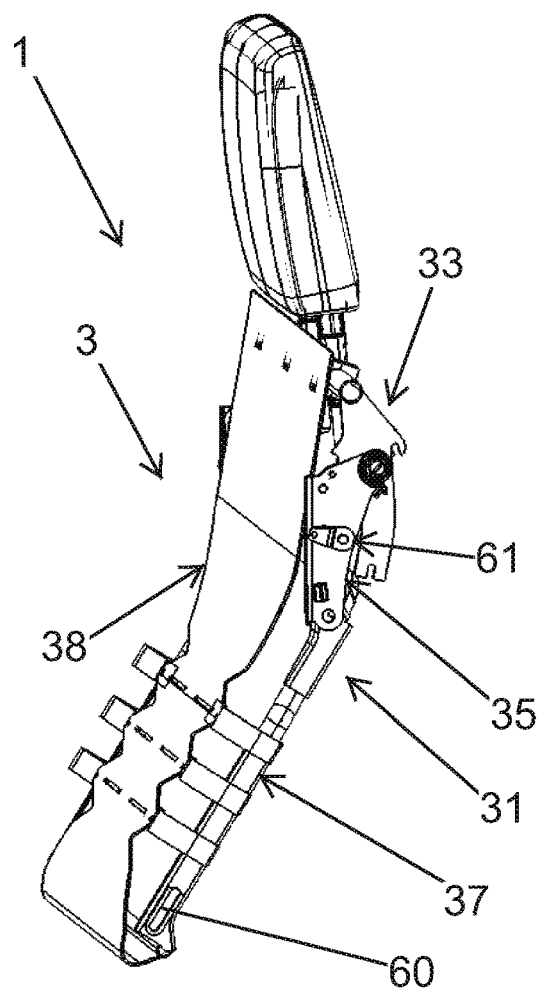
FIG. 9 is a perspective view of a portion of the stadium seat of FIG. 3.

FIG. 9 is a perspective view of a portion of the stadium seat 1. The seat back frame 31 includes an area 60 of the main seat back frame structure 37 that is pivotably connected to the vehicle connecting structure 9. The seat back frame 31 includes another area of the main seat back frame structure 37 that is pivotably connected to the vehicle connecting structure 11. When the actuator 27 is actuated, the seat back frame 31 is movable relative to the vehicle connecting structure 9 and the vehicle connecting structure 11.

Figure 10:
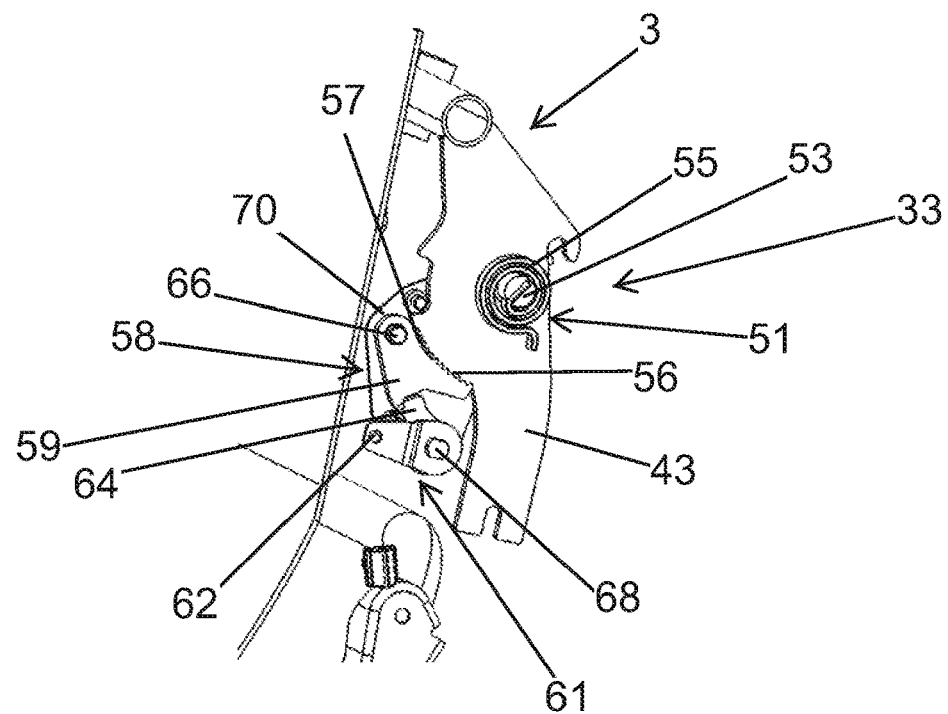
FIG. 10 is a detailed view of the seat back structure of the stadium seat of FIG. 3.

FIG. 10 is a detailed view of the seat back structure 3 in the area of the upper seat back frame structure 33. A locking/unlocking mechanism 58 is provided to fix the intermediate seat back frame structure 35 to the upper seat back frame structure 33 and to release (unlock) the intermediate seat back structure 35 such that the intermediate seat back structure 35 and the main seat back frame structure 37 are movable relative to the vehicle structure 17. A shaft 53 is connected to the upper seat back frame member 43. A spring 51 is connected to the shaft 53 and the intermediate frame member 45 (see FIGS. 3, 4, 5 and 9). The spring 51 pretensions the intermediate frame member 45. The spring 51 is shown as a coil spring 55, however the spring 51 may be any form of spring. The upper seat back frame member 43 has a plurality of teeth 56. A locking element 59 is arranged adjacent to the intermediate frame member 45. The locking element 59 has a plurality of teeth 57. The locking element 59 is pivotably connected to a shaft 66. The shaft 66 is connected to a plate member 70. The plate member 70 is connected to the intermediate frame member 45 and the upper seat back frame member 43. An unlocking element 61 and a locking element engaging element 64 are pivotably connected to a shaft 68. The unlocking element 61 is arranged on one side (outer side) of the intermediate frame member 45 (see FIGS. 3, 4, 5 and 9) and the locking element 59 and the locking element engaging element 64 are arranged on another side (inner side) of the intermediate frame member 45. The shaft 66 and the shaft 68 are connected to the intermediate frame member 45. The locking element engaging element 64 is in contact with the locking element 59. The unlocking element 61 has an opening 62. The opening 62 receives a cable (not shown in FIG. 9), which is connected to the actuator 27. When the actuator 27 is actuated by the occupant, the unlocking element 61 and the locking element engaging element 64 rotate due to the cable being pulled such that the locking element 59 moves in a direction away from the upper seat back frame member 43 so that the teeth 57 do not engage the teeth 56, which allows the intermediate frame structure 33 and the main frame structure 37 to move so that the seat back user support structure 38 moves from a back full forward position to the back full rear position and/or any position in between the back full forward position and the back full rear position. Another locking/unlocking mechanism 72 is provided to fix the intermediate seat back frame structure member 42 to the upper seat back frame structure member 34 and to release (unlock) the intermediate seat back frame structure member 42 such that the intermediate seat back frame structure member 42 and the main seat back frame structure 37 are movable relative to the vehicle structure 17. The structure of the another locking/unlocking mechanism 72 is identical to that of the locking/unlocking mechanism 58.

Figure 11:
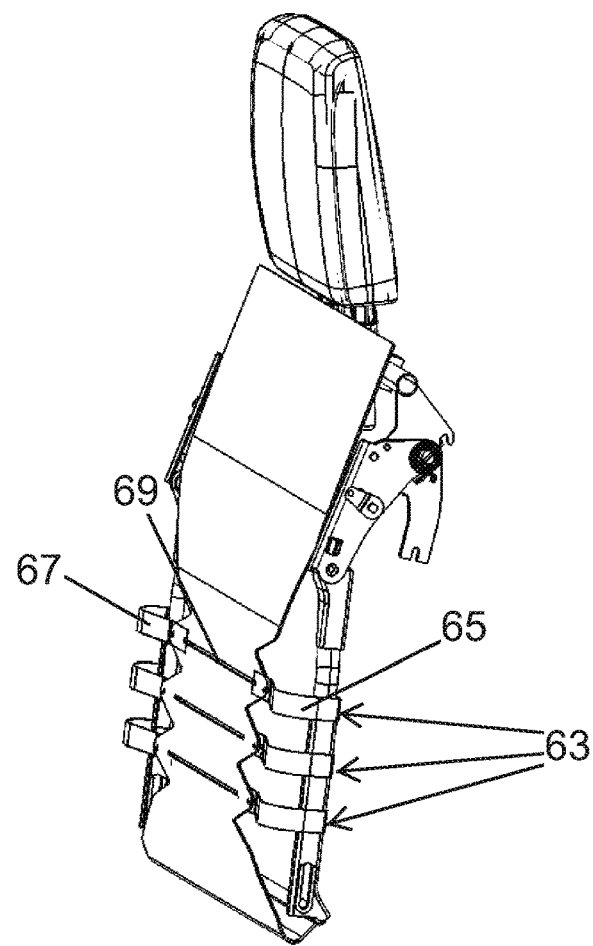
FIG. 11 is a perspective view of a portion of the stadium seat of FIG. 3.
Figure 12:
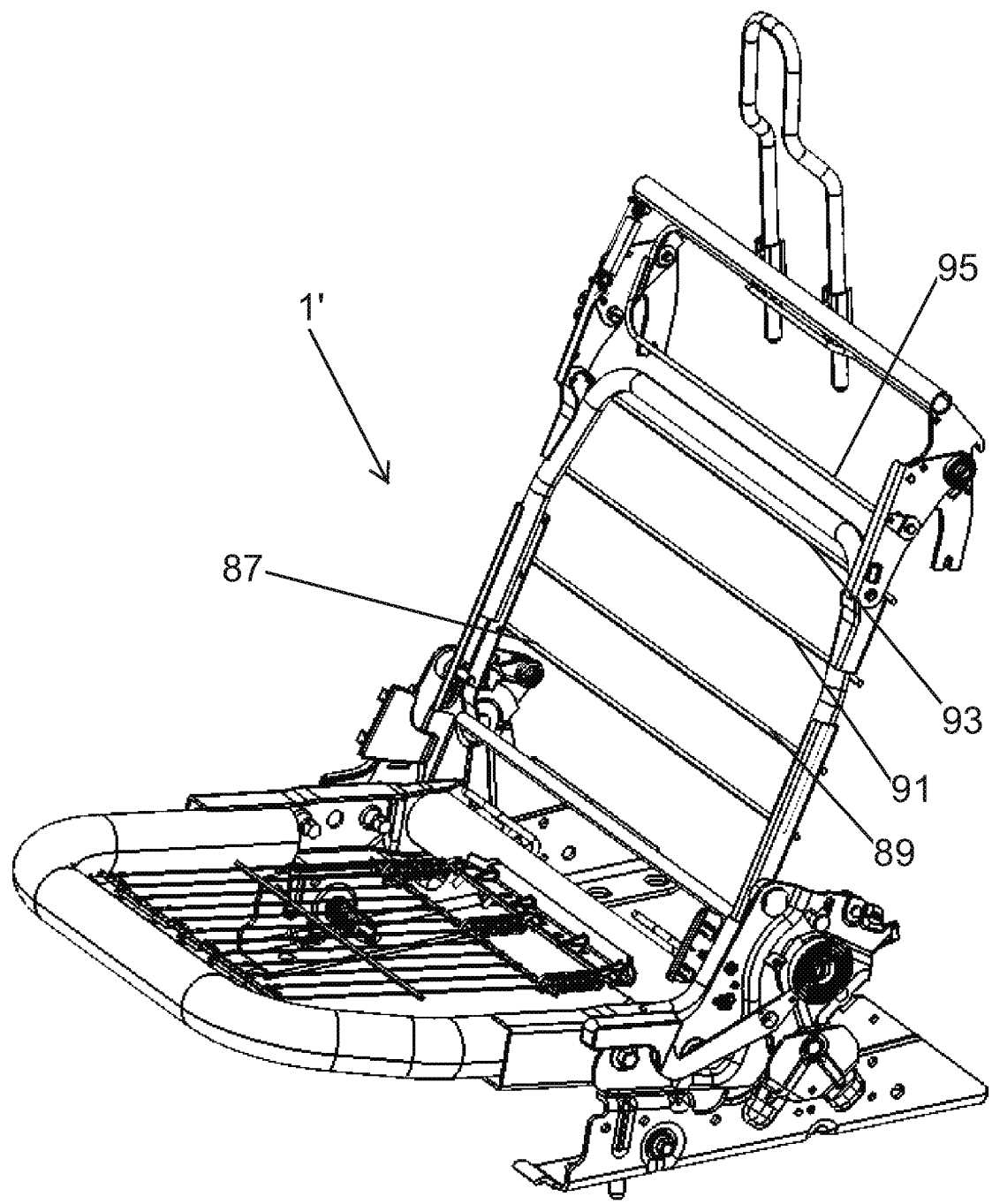
FIG. 12 is a perspective view of another embodiment of a stadium seat.

FIG. 11 is a perspective view of a portion of the stadium seat 1. A plurality of seat back user supporting structures 63 are connected to the main seat back frame structure 37. Each of the seat back user supporting structures 63 has a seat back user supporting element 65, another seat back user supporting element 67 and a slot 69 that is provided between the seat back user supporting element 65 and the another seat back user supporting element 67. The seat back user supporting elements may be formed of metal or plastic or any other suitable material. The seat back user supporting elements support the seat back user support surface 38. The seat back user support structure 38 may be formed as a singular molded piece as disclosed in U.S. provisional application No. 62/003,278, the entire contents of which are hereby incorporated by reference, which affixes and deflects in a lumbar region of the user and hammocks in a shoulder area of the user. In another embodiment, the seat back user support structure 38 may be formed of foam wherein the foam can be segmented near the pivot connections 46, 47, 48, 49 to allow portions of the foam to move relative to each other when the intermediate seat back frame structure 35 and the main frame seat back structure 37 move. FIG. 12 is a perspective view of another embodiment of a stadium seat P. The stadium 1' is exactly the same as the stadium seat 1 shown in FIGS. 1-11 except that a plurality of seat back user support members 87, 89, 91, 93, 95 are provided for supporting a seat back user support structure that is formed of foam.

Figure 13:
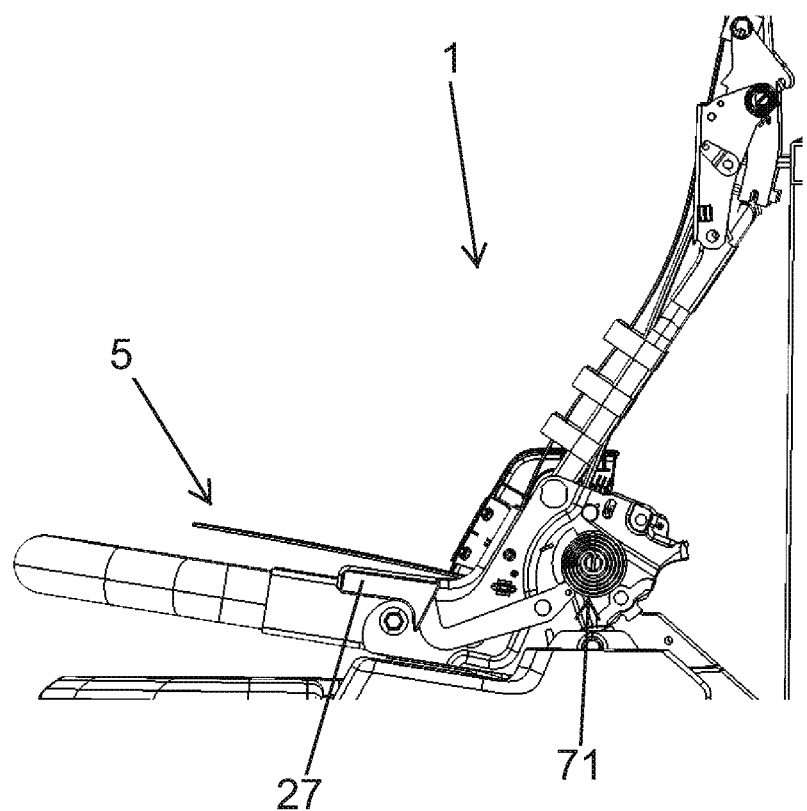
FIG. 13 is a side view of the stadium seat of FIG. 3 prior to an actuator being actuated.
Figure 14:
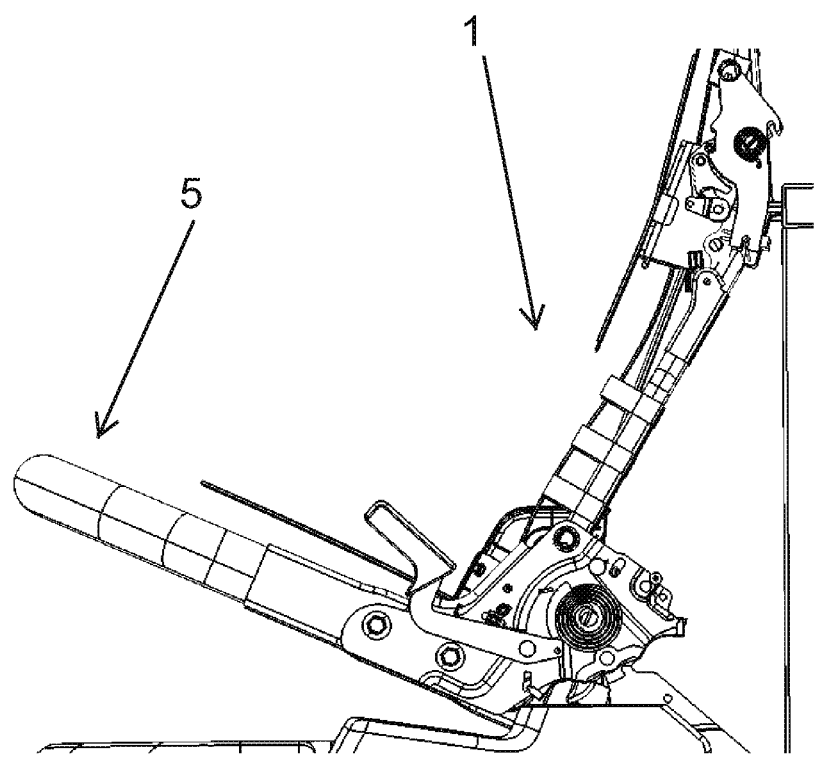
FIG. 14 is a side view of the stadium seat of FIG. 3 after the actuator is actuated.
Figure 15:
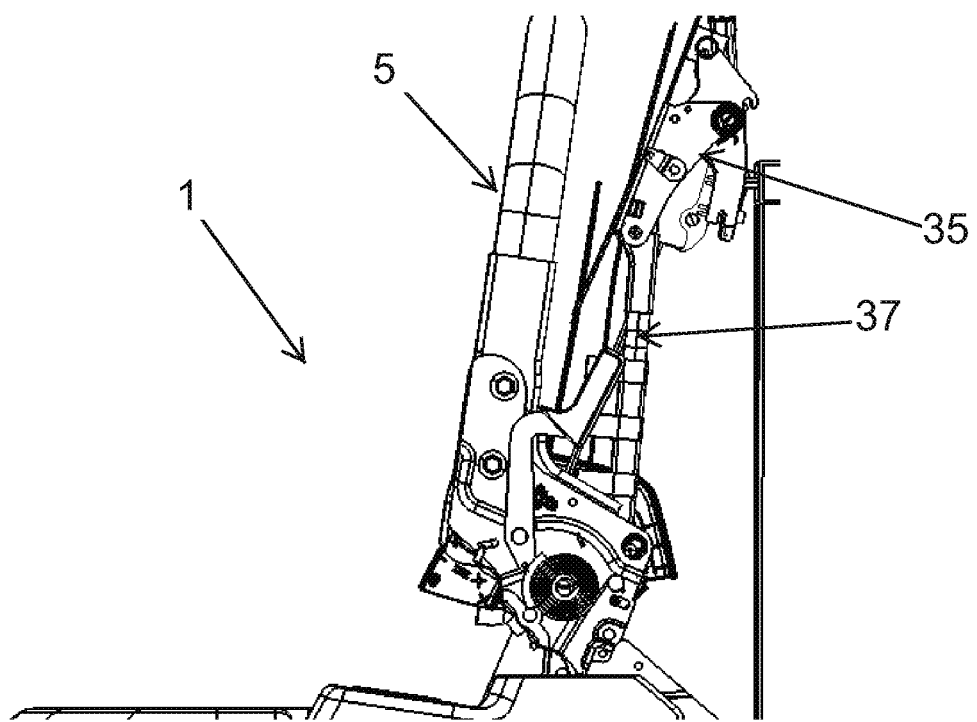
FIG. 15 is a side view of the stadium seat of FIG. 3 in the stadium seat position.

FIGS. 13, 14 and 15 are side views of the stadium seat 1. FIG. 13 shows the stadium seat 1 with the cushion 5 in the use position. When the occupant lifts the cushion 5, a cam 71 pushes on the actuator 27 such that the locking element 59 is unlocked so that seat back user support structure 38 moves such that the main seat back frame structure 37 extends in a vertical direction and the intermediate frame structure 35 is at an angle relative to the main seat back frame structure 37. FIG. 14 shows the cushion 5 moving from the use position to the stowed (stadium) position. FIG. 15 shows the cushion in the stowed (stadium) position. In the stowed (stadium) position, the cushion 5 is arranged in a vertical direction. It is understood that the stadium seat 1' is operated (actuated) in the same way to move from the use position to the stowed (stadium) position.

Figure 16:
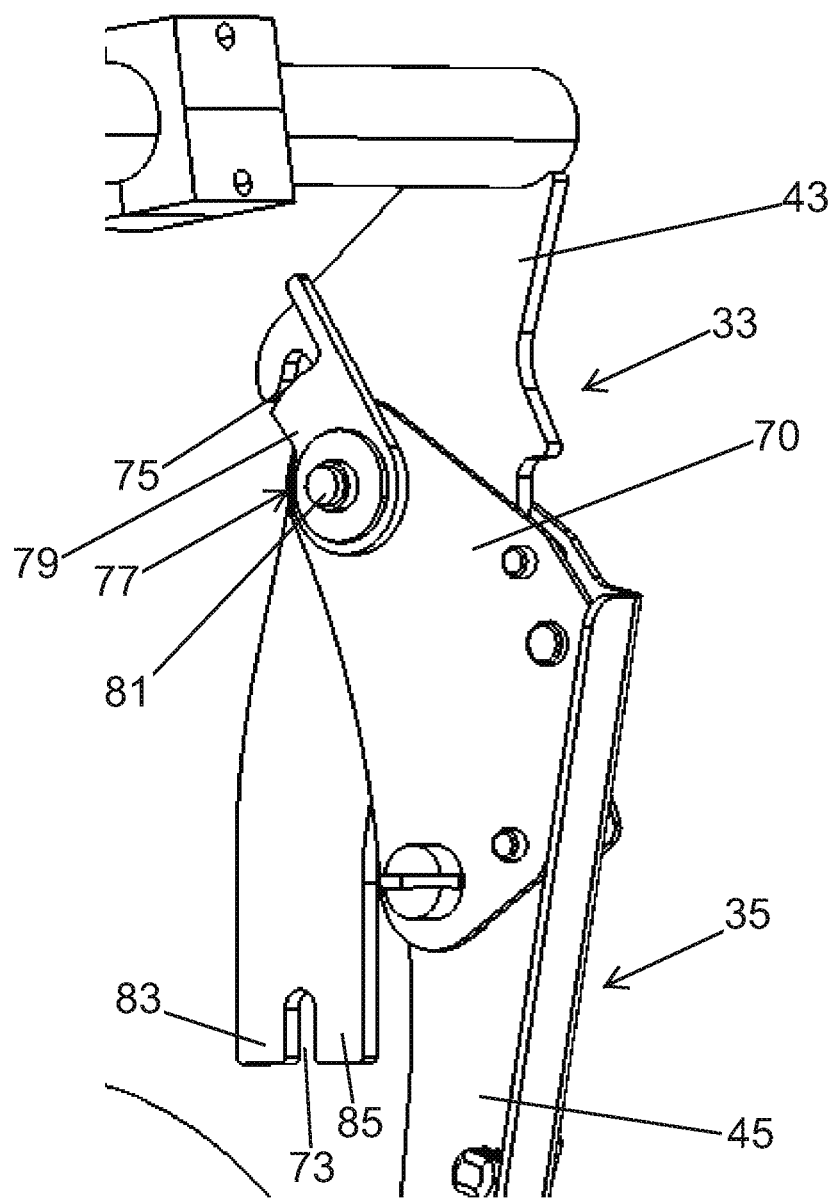
FIG. 16 is an enlarged perspective view of the stadium seat in an area of an inner side of an upper seat back frame structure.

FIG. 16 is an enlarged perspective view of the stadium seat 1 in an area of an inner side of the upper seat back frame structure 33 and an inner side of the intermediate seat back frame structure 35. The upper seat back frame structure member 43 has an opening 73 and an opening 75. A latching mechanism 77 is connected to the plate member 70. The latching mechanism 77 includes a latching member 79 that is rotatably connected to the plate member 70 via a shaft 81. The opening 73 is defined by a portion 83 of the upper seat back frame structure member 43 and another portion 85 of the upper seat back frame structure member 43. A rod of a rear wall of the vehicle structure 13 is inserted in the opening 73 and another rod of the rear wall of the vehicle structure 13 is inserted into the opening 75. The latch member 79 engages the another rod of the rear wall such that the latch member 79 rotates in a clockwise direction when the another rod is inserted into the opening 75. The latch member 79 rotates in a counter clockwise direction after the another rod is inserted into the opening 75 such the another rod is fixed between the latch member 79 and a portion of the upper seat back frame structure member 43 to fix the upper seat back frame structure 33 to the rear wall of the vehicle structure 13. The upper seat back frame structure member 34 is identical to the upper seat back frame structure member 43 and another latching mechanism, which is identical to the latching mechanism shown in FIG. 16, is provided to connect the upper seat back frame structure member 34 to the another rod of the rear wall of the vehicle structure 13.

While specific embodiments of the invention have been shown and described in detail to illustrate the application of the principles of the invention, it will be understood that the invention may be embodied otherwise without departing from such principles.

LIST OF REFERENCE CHARACTERS

1 Stadium Seat
3 Seat back
5 Cushion
7 Headrest structure
9 Vehicle seat connecting structure
11 Vehicle seat connecting structure
13 Vehicle structure
15 Vehicle Floor
17 Vehicle seat support structure
19 Upward extending member
21 Upward extending member
23 Transverse member
25 Release mechanism
27 Actuator
28 Lever
29 Release mechanism housing
31 Seat back frame
33 Upper seat back frame structure
34 Upper seat back frame member
35 Intermediate seat back frame structure
36 Upper seat back frame transverse member
37 Main seat back frame structure
38 Seat back user support structure
38a Seat back user support structure surface
39 Seat back member
40 Seat back member
41 Transverse member
42 Intermediate frame member
43 Upper seat back frame member
45 Intermediate frame member
46 Pivot connection
47 Pivot connection
48 Pivot connection
49 Pivot connection
51 Spring
53 Shaft
55 Coil spring
56 Teeth
57 Teeth
58 Locking/unlocking mechanism
59 Locking element
60 Pivot connection area
61 Unlocking element
62 Opening
63 Seat back user supporting structure
64 Locking element engaging member
65 Seat back user support element
66 Shaft
67 Seat back user support element
68 Shaft
69 Slot (space)
70 Plate member
71 Cam
72 Locking/unlocking mechanism
73 Opening
75 Opening
77 Latching mechanism
79 Latch member
81 Shaft
83 Upper seat back frame structure member portion
85 Upper seat back frame structure member portion
87 Seat back user support member
89 Seat back user support member
91 Seat back user support member
93 Seat back user support member
95 Seat back user support member

What is claimed is:

1. A stadium seat, comprising:
   a cushion; and
   a seat back structure including a first seat back structure frame directly coupled to a second seat back structure frame by a first pivot connection, and a third seat back structure frame coupled to said second seat back structure frame by a second pivot connection, said third seat back structure frame coupled to said cushion, said second seat back structure frame being arranged between said first seat back structure frame and said third seat back structure frame, said third seat back structure frame being arranged between said cushion and said second seat back structure frame, said second seat back structure frame is movable between a locked state and a released state, wherein said third seat back structure frame is configured to move in a rearward direction away from said cushion relative to said cushion and said first seat back structure frame when said second seat back structure frame moves from said locked state to said released state, wherein said first seat back structure frame is not movable relative to a stadium seat support structure, wherein said stadium seat support structure extends upwardly from a floor and said third seat back structure frame and said cushion are rotatably coupled relative to the floor, and wherein said first seat back structure frame is spaced apart from and not directly coupled to said third seat back structure frame.

2. The stadium seat in accordance with claim 1, further comprising:
   an actuator; and
   a locking/unlocking mechanism connected to said actuator, wherein said first seat back structure frame, said second seat back structure frame and said third seat back structure frame are movable when said actuator is actuated to adjust said seat back structure from a forward seat back position to a rearward seat back position, said first seat back structure frame, said second seat back structure frame and said third seat back structure frame defining a planar frame configuration in said forward seat back position, said first seat back structure frame, said second seat back structure frame and said third seat back structure frame defining a non-planar frame configuration in said rearward seat back structure position.

3. The stadium seat in accordance with claim 2, wherein said seat back structure comprises a planar user contact surface in said forward seat back position, said seat back structure having a non-planar user contact surface in said rearward seat back position.

4. The stadium seat in accordance with claim 3, wherein said seat back structure comprises one of a one-piece panel and a plurality of foam segments.

5. The stadium seat in accordance with claim 2, wherein said cushion is mounted for movement such that said cushion is movable from a use position to a stadium position, said cushion extending in a horizontal direction in said use position, said cushion extending in a vertical direction in said stadium position.

6. The stadium seat in accordance with claim 2, wherein said first seat back structure frame is arranged in an upper area of said seat back structure, said second seat back structure frame extending between said first seat back structure frame and said third seat back structure frame.

7. The stadium seat in accordance with claim 6, wherein said locking/unlocking mechanism comprises a locking element having a plurality of first teeth, said first seat back structure frame comprising a plurality of second teeth, said first teeth engaging said second teeth to lock said first seat back structure frame, said second seat back structure frame and said third seat back structure frame in a fixed position.

8. The stadium seat in accordance with claim 7, wherein said first teeth are located at a spaced location and disengaged from said second teeth when said actuator is operated such that at least said second seat back structure frame and said third seat back structure frame are movable relative to each other.

9. The stadium seat in accordance with claim 2, wherein said seat back structure is incrementally adjustable when said actuator is actuated.

10. The stadium seat in accordance with claim 1, wherein a portion of said first seat structure frame is configured to selectively cooperate with a locking/unlocking mechanism disposed adjacent said second seat structure frame.

11. A stadium seat, comprising:
    a cushion;
    a seat back frame comprising a first seat back frame portion, a second seat back frame portion and a third seat back frame portion, said second seat back frame portion being arranged between said first seat back frame portion and said third seat back frame portion, said third seat back frame portion being arranged between said cushion and said second seat back frame portion, said first seat back frame portion directly coupled to said second seat back frame portion, and said third seat back frame portion coupled to said second seat back frame portion, said third seat back frame portion coupled to said cushion, wherein said first seat back frame portion is not movable relative to a stadium seat support structure, wherein said stadium seat support structure extends upwardly from a floor and said third seat back frame portion and said cushion are rotatably coupled relative to the floor, and wherein said first seat back frame portion is spaced apart from and not directly coupled to said third seat back frame portion;
    a seat back user support structure connected to said seat back frame;
    an actuator; and
    a locking/unlocking mechanism connected to said seat back frame, said actuator actuating said locking/unlocking mechanism such that said locking/unlocking mechanism changes from a locking state to an unlocking state when said actuator is actuated, wherein a contour of said seat back user support structure changes when said actuator is actuated, wherein said second seat back frame portion rotates relative to said first seat back frame portion when loaded and said third seat back frame portion rotates relative to said cushion in a rearward direction away from said cushion when said locking/unlocking mechanism changes from said locking state to said unlocking state.

12. The stadium seat in accordance with claim 11, wherein said third seat back frame portion is configured to move relative to said first seat back frame portion in said unlocking state, wherein said third seat back frame portion goes to a reclined position in said unlocking state when loaded.

13. The stadium seat in accordance with claim 11, wherein said seat back user support structure moves from a forward seat back position to a rearward seat back position when said actuator is in said unlocking state.

14. The stadium seat in accordance with claim 13, wherein said seat back user support structure comprises a planar occupant contact surface in said forward seat back position, said seat back user support structure having a non-planar occupant contact surface in said rearward seat back position.

15. The stadium seat in accordance with claim 11, wherein said first seat back frame portion comprises a stadium seat support structure contact surface for contacting said stadium seat support structure located in said rearward direction of said stadium seat.

16. The stadium seat in accordance with claim 11, wherein said locking/unlocking mechanism comprises a locking element, said locking element comprising a plurality of first teeth, said first seat back frame portion comprising a plurality of second teeth, said first teeth engaging said second teeth in said locked state, said first teeth being located at a spaced location from said second teeth in said unlocked state.

17. The stadium seat in accordance with claim 16, wherein said actuator is configured to release said locking element from a motion driving said seat back frame to a stadium position such that a biasing element drives said seat back frame to a planar position.

18. The stadium seat in accordance with claim 11, wherein said seat back structure is incrementally adjustable when said actuator is actuated.

19. The stadium seat in accordance with claim 11, wherein said seat back user support structure comprises one of a one-piece panel and a plurality of foam segments.

20. A vehicle seat, comprising:
a cushion; and
a stadium seat including a first seat back structure frame directly coupled to a second seat back structure frame by a first pivot connection, and a third seat back structure frame coupled to said second seat back structure frame by a second pivot connection, said third seat back structure frame coupled to said cushion, said second seat back structure frame being arranged between said first seat back structure frame and said third seat back structure frame, said third seat back structure frame being arranged between said cushion and said second seat back structure frame, said second seat back structure frame is movable between a locked state and a released state, wherein said third seat back structure frame is configured to move in a rearward direction away from said cushion relative to said cushion and said first seat back structure frame when said second seat back structure frame moves from said locked state to said released state, wherein said first seat back structure frame is not movable relative to a vehicle seat support structure, wherein said stadium seat support structure extends upwardly from a floor and said third seat back structure frame and said cushion are rotatably coupled relative to the floor, and wherein said first seat back structure frame is spaced apart from and not directly coupled to said third seat back structure frame.

* * * * *